(No Model.) 2 Sheets—Sheet 1.

J. G. WEBER.
CONVERTIBLE WAGON, SLEIGH, OR CABINET.

No. 565,310. Patented Aug. 4, 1896.

WITNESSES:
W. P. Patton
Herbert A. Thorp

INVENTOR
J. G. Weber
BY
[signature]
ATTORNEYS.

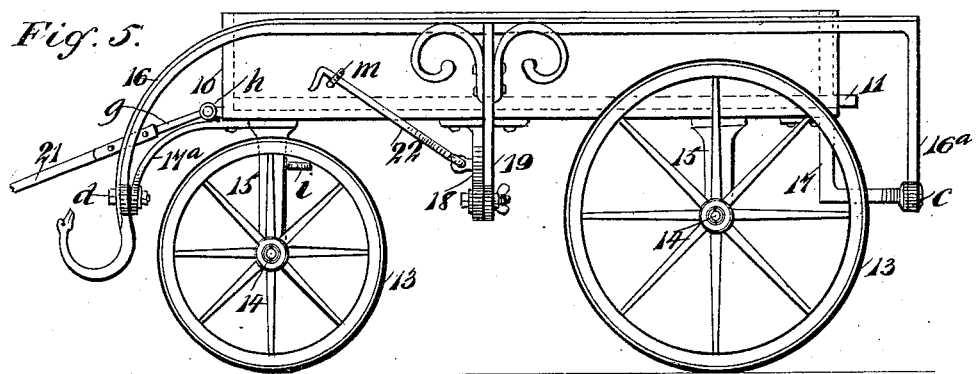
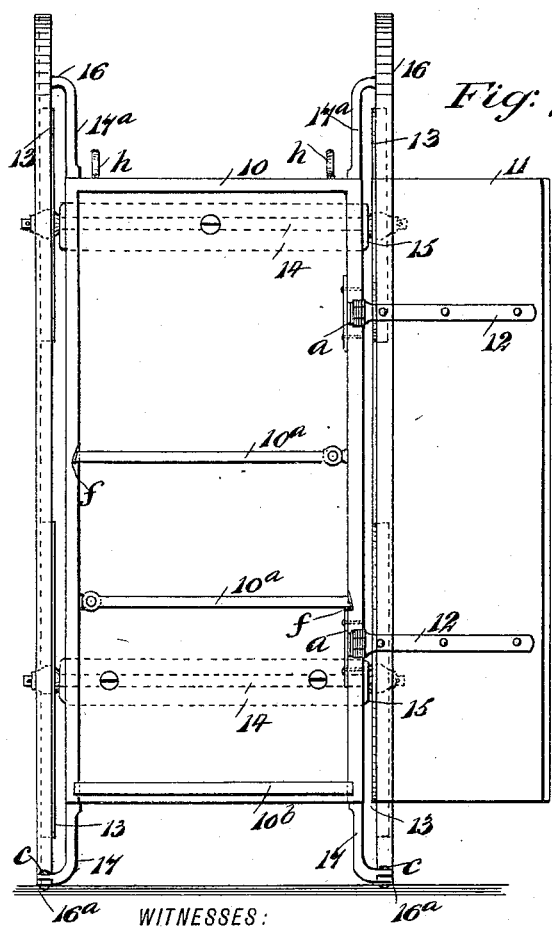
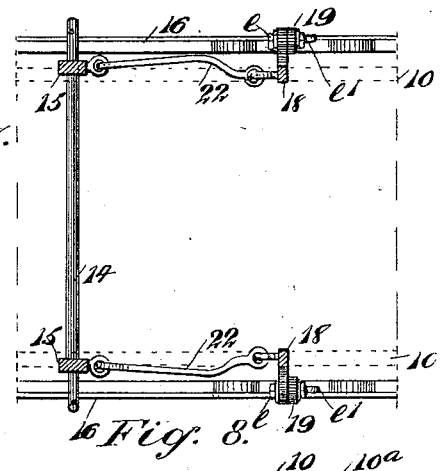
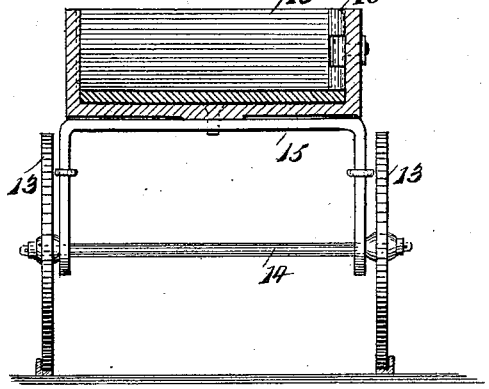

UNITED STATES PATENT OFFICE.

JOHN GEORGE WEBER, OF BROOKLYN, NEW YORK.

CONVERTIBLE WAGON, SLEIGH, OR CABINET.

SPECIFICATION forming part of Letters Patent No. 565,310, dated August 4, 1896.

Application filed March 5, 1896. Serial No. 581,881. (No model.)

*To all whom it may concern:*

Be it known that I, JOHN GEORGE WEBER, of Brooklyn, in the county of Kings and State of New York, have invented a new and Improved Convertible Wagon, Sleigh, or Cabinet, of which the following is a full, clear, and exact description.

This invention relates to a novel convertible wagon, sleigh, and cabinet, and has for its object to provide a child's toy wagon or other wheeled vehicle with simple attachments which will afford means for the quick and convenient conversion of the wagon into a sleigh, and also to adapt the device for use as a cabinet having a door hung on hinges.

The invention consists in the construction and combination of parts, as is hereinafter described, and pointed out in the claims.

Reference is to be had to the accompanying drawings, forming a part of this specification, in which similar characters of reference indicate corresponding parts in all the figures.

Figure 1:
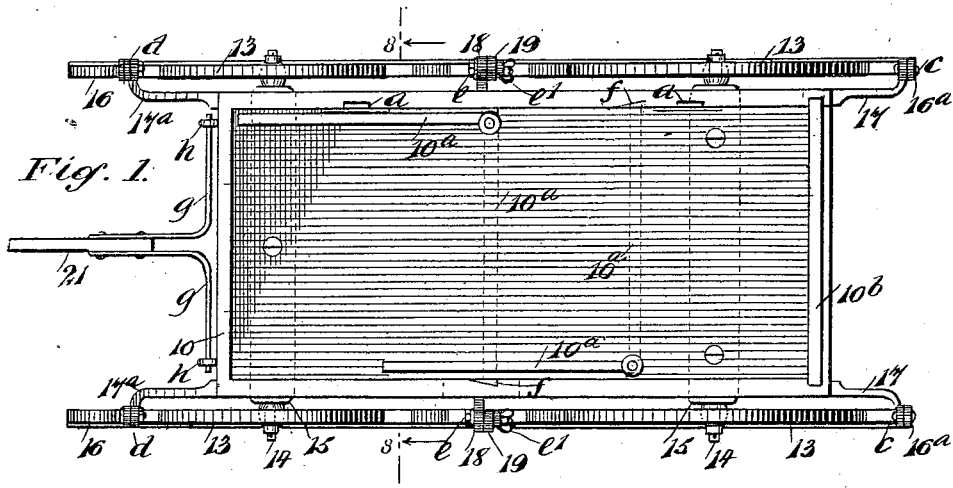
Figure 2:
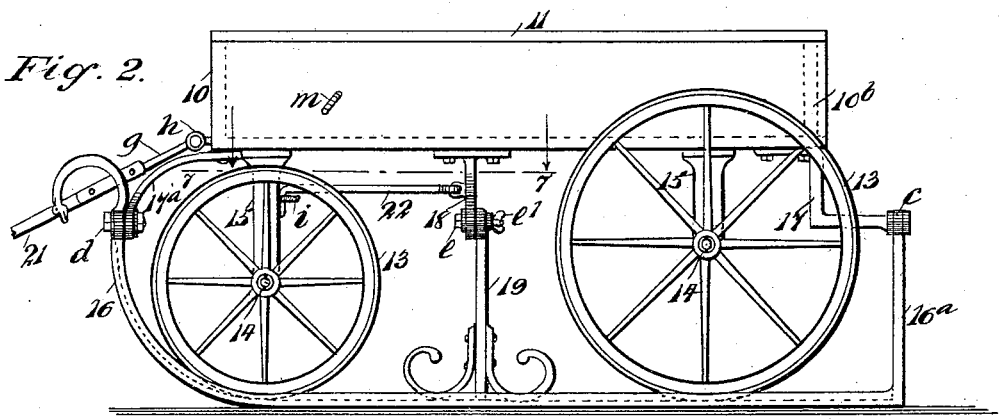
Figure 3:
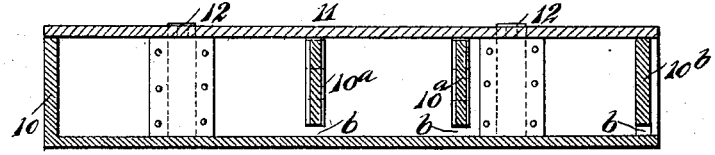
Figure 4:
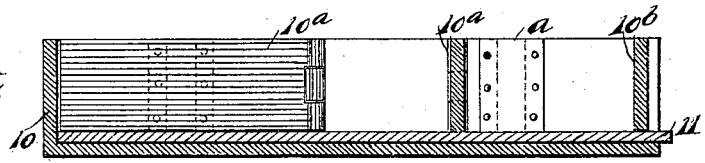

Figure 1 is a plan view of the combined wagon and sleigh, the wagon-body being open at its upper side. Fig. 2 is a side view of the convertible wagon and sleigh having parts adjusted to adapt the device for use as a sleigh. Fig. 3 is a longitudinal sectional view of the wagon and sleigh body with the hinged cover therefor in position and swinging supports for said cover adjusted transversely of the body. Fig. 4 is a longitudinal sectional view of the vehicle-body, showing the cover disposed to afford a false bottom for the body. Fig. 5 is a side view of the convertible vehicle having parts adjusted for service as a wagon. Fig. 6 represents the convertible device arranged to serve as an upright closable cabinet. Fig. 7 is a partly-sectional detail view essentially on the line 7 7 in Fig. 2, showing an imposed body portion in dotted lines; and Fig. 8 is a transverse sectional view substantially on the line 8 8 in Fig. 1.

In the application of the features of this invention to a wheeled vehicle different forms of the body portion may be provided, and a two-wheeled vehicle may be converted into a sleigh or closed cabinet as readily as can a four-wheeled wagon.

The embodiment of my invention as illustrated in the drawings represents the novel features applied to a four-wheeled wagon, the body 10 provided therefor being rectangular or in the ordinary box form. The body 10 is normally open at the upper side, but is furnished with an attachable cover 11, which is of sufficient area to properly cover the side and end walls of said body when applied thereto. The preferred means for removably connecting the cover 11 with the body 10 consists in providing a pair of strong strap-hinges 12, that have one leaf of each hinge slid into an upright pocket $a$, formed to receive it in one side of the body 10, the remaining leaves of said hinges being secured on the side of the cover, and as the pockets mentioned are suitably spaced apart it will be evident on inspection of Fig. 6 that the cover 11 will serve as a door if the body of the vehicle is stood upright.

There are two shelf-boards $10^a$ provided for the body 10, that are hinged by one end of each board to the inner side of one of the sides of the body at a suitable distance from each other and from the tail-board $10^b$ of said body.

When not in service as a cover or door, the piece 11 is carried within the body 10 as a false bottom, and to permit its free introduction therein the shelf-boards $10^a$ are so proportioned in breadth that a space or crevice $b$ equal to the thickness of the piece 11 will be afforded between the lower edges of the said shelf-boards and the fixed bottom of the body 10. A similar space or crevice $b$ is provided between the lower edge of the tail-board and the bottom mentioned, as shown in Fig. 3, so that the cover-piece 11 may be introduced endwise within the box-body 10, having contact with its fixed bottom, and the shelf-boards $10^a$ should be made to bind on the part 11 to hold it in place within the wagon-body.

The wheels 13 are rotatably supported on the body 10 by axles that are connected with similarly-bent hounds 15, the rear hound being secured transversely on the lower side of the fixed bottom of the body and the forward hound centrally pivoted thereon, so as to permit a proper swinging movement of the front wheels, as is common in four-wheeled vehicles; and it is essential that the parallel pendent limbs of the hounds be so relatively proportioned in length that the axles they are connected with will be properly disposed to receive and sustain the differently-diametered front and rear wheels of the vehicle.

An important feature of the novelty consists in the provision of a pair of peculiarly-disposed sleigh-runners 16, which are designed to convert the wagon into a sliding vehicle in a few minutes, and the reverse, as occasion may require. The runners 16 are preferably formed of two light angle-iron bars, which are forwardly bent to afford curved front ends of conventional shape, their rear portions near the end of each runner being bent at a right angle thereto, thus providing the similar straight rear legs 16$^a$. Such a proportionate length is afforded the similar runners 16 as will permit the front and rear portions of the same to project beyond the ends of the body 10 when connected therewith. The preferred means for attaching the runners to the body 10 consists in provision of the following-described parts.

At the rear end of the body 10 two similar bracket-arms 17 are secured, these being essentially Z-shaped, and by their manner of attachment to the body are caused to depend therefrom and project the main members at their lower ends rearwardly an equal distance and in the same horizontal plane for pivotal connection, as at $c$, with the legs 16$^a$ of the runners 16. Two preferably curved arms 17$^a$ are secured by one end of each to project at the front end of the body 10 at each side thereof, said arms being downwardly and outwardly bent to permit their lower ends to have pivotal engagement at $d$ with the curved portions of the runners, as is clearly shown in Figs. 2 and 5. From the lower side of the body 10 two similar hanger-arms 18 are hung, which depend at opposite points between the front and rear wheels of the wagon. Said arms are outwardly curved a suitable degree to permit them to have a lapped and jointed engagement effected at their lower ends with the upper ends of two like standards 19, the latter being attached by their other ends to the runners 16, such connections being laterally stiffened by the braces 20, which engage opposite sides of the standards and are also secured to the runners by any preferred means.

The pivotal joints between the end portions of the standards 19 and hanger-arms 18 are preferably produced by pintle-bolts $e$, having winged nuts $e'$ to enable said joints to be clamped and thus retain the runners 16 at any desired point of swinging adjustment, and for efficient operation the three joints $c\ d\ e$ for each runner should be axially alined. Such a relative proportion of parts is provided that the runners 16 will be permitted to rock on their pivot-supports and when adjusted as shown in Figs. 1 and 2 will have flanged portions of their angular bodies located below and in loose contact with the peripheries of the wheels 13, the runners, if secured in position when thus adjusted, being parallel and adapted to have their treads in sliding contact with a snow-covered road-bed, thus virtually converting the wheeled vehicle into a sleigh.

When the improvement is utilized as a sleigh, the cover-piece 11 is preferably positioned to have a hinged engagement with the upper edge of the vehicle-body and rest level thereon and also on the shelf-pieces 10$^a$, the latter being then transversely disposed. Said shelves will have their free ends resting on ledges, that may be formed integrally in the sides of the body 10, as shown at $f$, or be attached to said sides, so as to afford support to the shelf-pieces, maintaining them in parallel planes, and thus adapted to aid the support of the piece 11, which in this case becomes the top board of the sleigh.

If the device is to be used as a wagon, it is only necessary for its conversion to loosen the nuts $e'$, swing the runners outward and then upward into the position indicated in Fig. 5, and then tighten said nuts, which will dispose the sleigh-runners at each side of the body 10, permitting the latter to receive support from the wheels 13. A tongue 21 is furnished for the manual draft of the vehicle, either as a wagon or a sleigh, and to facilitate removal of the tongue, which at times may be necessary, the connecting members $g$ of the tongue are measurably elastic, and thereby enabled to be engaged at their pintle ends with screw-eyes or staples $h$ on the front of the body 10, or be so compressed toward each other as to remove said pintle ends from the ring-eyes for detachment of the tongue.

When the vehicle is to be converted into a sleigh, it is of advantage to prevent the swinging movement of the front hound and consequently of the front axle and wheels. To this end keeper-hooks 22 are provided, which are oppositely and loosely attached by rear ends to the depending hanger-arms 18 and hooked at their forward ends into staples or ring-eyes $i$ on the depending limbs of the front hound, which connection of parts will obviously retain the hound from a swinging movement.

On the conversion of the sleigh into a wagon, the hooks 22 are lifted and engaged with suitable projections $m$ on the sides of the body 10, as indicated in Fig. 5, where one hook is shown, and to facilitate such an engagement of the hooks their bodies are laterally bent, substantially as represented in Fig. 7.

In the illustration presented as an embodiment of my invention the vehicle is to be used as a child's wagon or sleigh, and as in large cities, where the novel device is especially well adapted for use, it is advantageous to economize space it will occupy when not in outdoor use, the convertible vehicle may be utilized as a small cabinet to contain other playthings used by children, the device then having its parts arranged as shown in Fig. 6, which will enable the body 10, when placed upright in a corner or against a side wall of a room, to receive any small articles that may be laid on the shelf-boards 10$^a$ and also on the tail-board 10ᵇ, the runners 16, that are in this case folded as for a wagon, affording bases at their angular bent rear ends for the support of the upright cabinet, the door 11 then having hinged connection with the body, so that a closed cupboard or cabinet is provided as an additional toy for the owner of the convertible vehicle.

Having thus described my invention, I claim as new and desire to secure by Letters Patent—

1. The combination of a vehicle-body, runners extending along opposite sides of the same and pivoted at opposite ends thereto, said runners being arranged when moved in one direction to be folded up against the sides of the body, and when moved in the other direction to stand in position to support the body, wheels on which the body is arranged to run when the runners are raised, said wheels being arranged to rest on the runners when the same are lowered, and means to hold the runners in raised and lowered positions, substantially as set forth.

2. The combination of a vehicle-body, runners extending along opposite sides of the body and having their opposite ends pivotally connected thereto, hanger-arms depending from the central portion of the body at opposite sides thereof, standards extending up from the central portions of the runners, means to lock the ends of the standards to the adjacent ends of the corresponding hangers, wheels on which the vehicle-body is arranged to run when the runners are raised, and means to hold the runners in raised and lowered positions, substantially as set forth.

3. The combination of a vehicle-body, hangers extending down at opposite sides of opposite ends of said body, runners extending longitudinally of the body and pivoted at opposite ends to the lower ends of the hangers, said runners being adapted when raised to be folded against the sides of the body, and when lowered to stand in the position to support the vehicle, wheels on which the body is arranged to run when the runners are raised, hangers depending from opposite sides of the central portion of the body, standards projecting from the central portions of the runners, bolts connecting the adjacent ends of the standards and hangers, and nuts arranged to screw on the bolts to lock the standards and hangers together, substantially as set forth.

4. The combination of a vehicle-body having a bottom and side walls, shelf-boards each connected at one end to one side board of the body and having its lower edge spaced away from the bottom of the body, and a cover for the top of the body having detachable fastening devices to connect it to the body and adapt it when detached therefrom to be inserted in the spaces beneath the shelf-boards and the bottom of the body, substantially as set forth.

5. The combination of a wagon-body having side walls provided with sockets extending along their inner surfaces, and a cover for the top of the body having hinges each provided with a leaf projecting from it and adapted to be engaged in one of the sockets in the side wall of the body, substantially as set forth.

JOHN GEORGE WEBER.

Witnesses:
WM. P. PATTON,
JNO. M. RITTER.